Dec. 22, 1936.  J. D. JEANDELL  2,065,074
HOBBYHORSE
Filed June 13, 1935
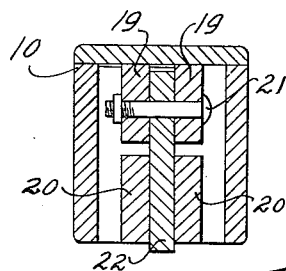
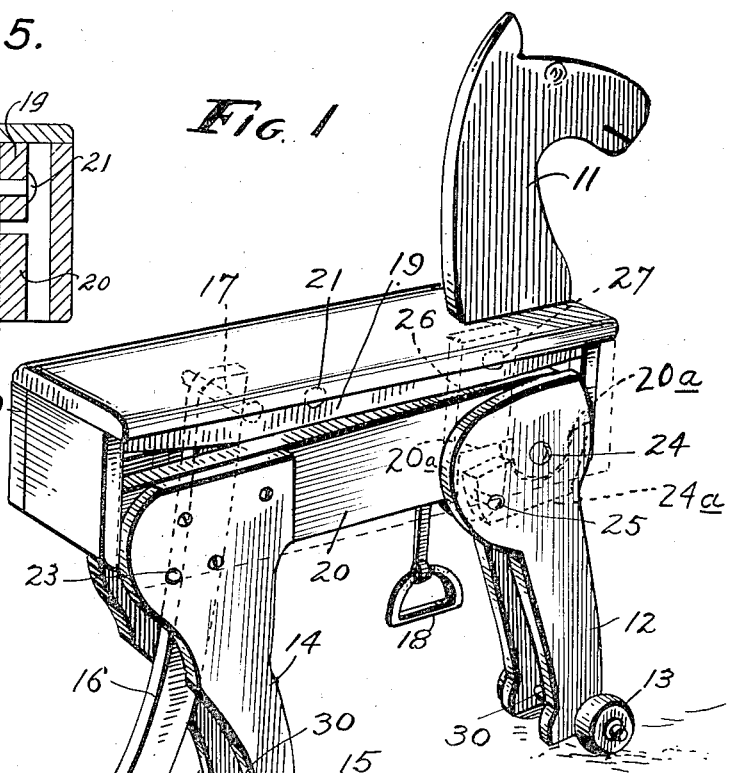
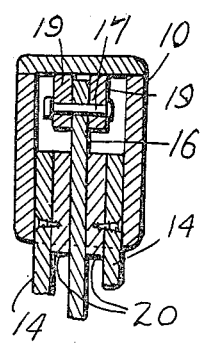
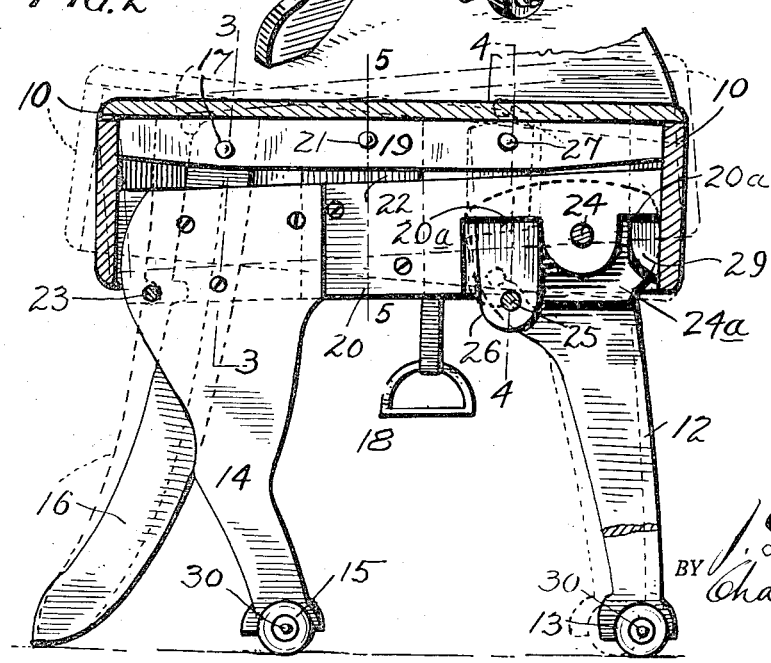
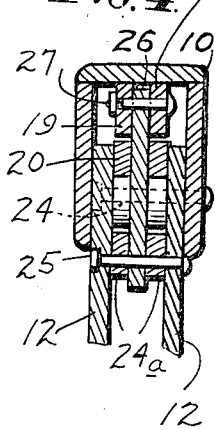
INVENTOR.
J. D. Jeandell,
BY Chas. J. Williamson
ATTORNEY Patented Dec. 22, 1936

2,065,074

UNITED STATES PATENT OFFICE 2,065,074

HOBBYHORSE

James D. Jeandell, Wilmington, Del.

Application June 13, 1935, Serial No. 26,480

5 Claims. (Cl. 272—53)

The object of my invention is to provide a hobby horse, movable over a horizontal surface with a rider astride, and capable of producing automatically, motions up and down, corresponding to or simulating the motions of a horse.

Other objects and advantages of my invention will be appreciated or understood from the embodiment of my invention shown in the drawing as an exemplification of my invention and from the description thereof, hereinafter set forth in some detail.

To achieve the objects or purposes of my invention, my invention consists in whatever is described by or is included within the terms or scope of the appended claims.

In the annexed drawing—

Fig. 1 is a perspective view of a hobby horse, embodying my invention; the near side of the body being removed;

Fig. 2 is a longitudinal vertical section, the full lines showing the position of the movable members when the hobby horse is at a state of rest, and the dotted lines showing the positions to which such parts are movable;

Fig. 3 is a vertical cross-section on the line 3—3 of Fig. 2.

Fig. 4 is a vertical cross-section on the line 4—4 of Fig. 2.

Fig. 5 is a vertical section on the line 5—5 of Fig. 2.

Describing the structure shown in the drawing, it comprises, in correspondence with the form of a horse, a box-like member or body 10, a head and neck 11, at one end of the body, a pair of forelegs 12, with ground engaging rollers 13 at the foot or hoof end of the forelegs, a pair of hind legs 14, having ground-engaging rollers 15 at the hoof end, and a tail 16 pivoted at its upper end by a cross bolt 17 to the rear end portion of the body. The tail piece 16 extends downwardly from the body and has a length greater than the perpendicular distance from the pivot to the floor or ground surface, and capable of a limited rocking movement forward and back, so that with its lower end, which curves downward and rearward, resting upon the floor or ground and a rocking motion up and down imparted by the rider, the tail will act pawl-like to push body and rider forward on the leg rollers. The end of the tail is more or less sharp so that it acts as a pawl or detent to prevent rearward movement of such end under the weight of the rider on the horse, and when the latter alternately rocks down at its rear end the tail thrusts the horse forward, the movement over the ground will take place automatically and progressively. Stirrups 18 are provided so that the rider may place his feet therein, and by swaying his body back and forth may rock the horse body.

The upper end of the tail is pivoted by the bolt 17 between a pair of spaced apart, longitudinally extending cleats 19, which extend from front to back of the body and constitute a sort of backbone that gives strength and rigidity to the body.

The hind legs are rigidly secured at their upper ends to the rear end of a horizontally extending lever or frame 20, which is formed of a pair of strips spaced apart to straddle the tail, these strips being situated below the cleats 19. The legs are secured to the outer sides of the strips just inside the side wall of the body 10. A cross bolt 21 passing through the cleats 19 and through the upper end of an arm 22, fixed to the lever 20 and projecting from the top thereof into the space between the two cleats 19. It will thus be seen that an up and down rocking motion, on a horizontal pivot 21, of the body 10 may take place. Up motion at the rear lifts the tail which then swings forward in contact with the ground. Ensuing down motion from down pressure of the rider on the body at the rear of the body causes the tail to thrust the body forward, as the tail cannot slide backward over the ground. Up motion of the front of the horse's body on the horizontal pivot 21, may be accompanied by back swing of the front legs with their rollers in contact with the floor or ground, and ensuing down motion of the front end of the body swings the front legs forward with their rollers in contact with the floor or ground. The back and forth swing of the front legs is limited by contact of their front and rear edges with stop surfaces 20a on lever 20 as hereinafter set forth. Normally the front legs incline forward and downward from their pivot 24, as shown in the drawing.

Forward motion of the tail, or reciprocally rearward motion of the horse's body when the tail acts as a stop or detent, is limited by using the rear edge of the lever arm 22 as a stop, and rearward swing of the tail is limited by having its rear edge encounter a cross stop pin 23, fixed to the rear end of the lever 20. As shown in dotted lines in Fig. 2, the tail has a notch in its rear edge to accommodate the bolt 23.

The forelegs 12 are pivoted at their upper ends by cross bolt 24 passing through the forward end of the lever 20. Just in rear of front leg pivot bolt 24, and below the latter, the forelegs have a pivoted connection by a cross bolt 25 to the lower end of a vertically extending link 26, which passes upward through the space between the sides of the lever 20, and is pivoted at its upper end by a bolt 27, passing through the backbone cleats 19. It will thus be seen that there may be back and forward swing of the forelegs 12 on the pivot 24 connecting them with the rear leg lever or extension frame 20, and by the link 26, as the horse body is rocked up and down by the rider.

Between the upper ends of the forelegs and below the pivot 24, there is a filler block 24a at each side of the suspending link 26, in order to make the structure parts fit with sufficient closeness to prevent any sidewise play or lost motion, and, for a like reason, there is a downward extension 29 from the shank of the neck 11 of the horse and which lies in the space between the front ends of the members of the lever 20. The filler block 24a is bifurcated, and when said block is pivoted on pivot 24, the two prongs of the block 24a by contact with the under surface 20a of the lever 20 inhibit motion beyond a predetermined point, one prong checking the motion in one direction, the other checking movement in the opposite direction.

The rollers are provided at the bottoms of each pair of legs and are mounted on the ends of a cross bar 30, extending between the lower portions of each pair of legs in order to form a substantial support for the legs.

It will be seen that, by my invention, a hobby horse is provided which automatically performs, or goes through motions, characteristic of, or resembling those of a horse, and that by the tail action, a forward or propelling movement may be produced by the rider while sitting upon the horse.

It will also be evident that the embodiment of my invention, shown in the drawing, may be inexpensively made of boards, and the construction is such that all required strength and rigidity are obtained. Of course, the hobby horse may be painted in various colors and made as ornamental or simple in appearance as desired.

What I claim is:

1. A toy animal comprising a body portion, a frame under the body, front legs pivotally attached to the front end of said frame, means to limit pivotal movement of the front legs, rear legs fixedly secured to the rear end of said frame, a tail piece pivotally secured to a rear portion of said body and extending downwardly to be engageable with the ground, and pivotal means securing said body portion to said frame to permit vertical rocking movement of the body, whereby rocking of the body on its pivotal means will cause the tail piece to effect an intermittent progressively forward push to the toy resulting in a lineal movement of the toy.

2. A toy as set forth in claim 1 further characterized by a pivotal link connection between the front legs and the front portion of the body, whereby the front legs may move back and forward with the rocking movement of the body.

3. A toy animal comprising a body portion, a frame under the body, front legs pivotally secured to the front end of said body portion and proportioned to cooperate with the underside of said body portion to limit the movement thereof, rear legs fixedly secured to the rear end of said frame, a tail piece longer than either of said legs and pivotally secured to said body portion and extending downwardly and rearwardly between said rear legs, and pivotal means securing said body portion to said frame intermediate the said front and rear legs to permit vertical rocking movement of the body whereby swaying of the body rider will rock the body and cause the tail piece to effect an intermittent progressively forward push to the toy resulting in a lineal movement of the toy.

4. A toy animal comprising a substantially horizontally disposed lever, front legs pivotally secured to one end of said lever, rear legs fixedly secured to the other end of said lever, a body portion surmounting the lever and pivoted intermediate its ends to said lever to have a rocking motion relative thereto, means for limiting said rocking motion, a tail piece pivotally secured to said body and extending downwardly and angularly to the perpendicular for engaging the ground, a pivotal link connection between the front legs and the body, whereby rocking of the body will move the tail piece to effect an intermittent progressively forward push to the toy resulting in a lineal movement of the toy and also movement of the front legs back and forth with the rocking movement of the body.

5. A toy animal comprising a body portion, a frame under the body, front legs attached to the front end of the frame, rear legs fixedly secured to the rear end of said frame, a tail piece pivotedly secured to the rear portion of the body and extending downwardly to be engageable with the ground, and pivotal means securing the body to said frame to permit vertical rocking movement of the body whereby rocking of the body on said pivotal means will cause the tail piece to effect an intermittent progressive push to the toy resulting in forward lineal movement of the toy.

JAMES D. JEANDELL.